(12) United States Patent
Feddema et al.

(10) Patent No.: US 12,465,055 B2
(45) Date of Patent: Nov. 11, 2025

(54) METHOD AND A SYSTEM FOR GENERATING BATCHES OF FOOD PIECES

(71) Applicants: MAREL POULTRY B.V., Boxmeer (NL); MAREL A/S, Aarhus N (DK)

(72) Inventors: Jan-Pieter Feddema, Boxmeer (NL); Henrik Kristiansen, Aarhus N (DK); Robert Van Der Kraan, Boxmeer (NL)

(73) Assignees: MAREL POULTRY B.V., Boxmeer (NL); MAREL A/S, Aarhus N (DK)

( * ) Notice: Subject to any disclaimer, the term of this patent is extended or adjusted under 35 U.S.C. 154(b) by 253 days.

(21) Appl. No.: 18/253,562

(22) PCT Filed: Nov. 22, 2021

(86) PCT No.: PCT/EP2021/082494
§ 371 (c)(1),
(2) Date: May 18, 2023

(87) PCT Pub. No.: WO2022/112171
PCT Pub. Date: Jun. 2, 2022

(65) Prior Publication Data
US 2024/0008500 A1      Jan. 11, 2024

(30) Foreign Application Priority Data
Nov. 24, 2020   (EP) .................................... 20209581

(51) Int. Cl.
*A22C 17/00*   (2006.01)
*A22C 21/00*   (2006.01)
(Continued)

(52) U.S. Cl.
CPC ........ *A22C 17/002* (2013.01); *A22C 17/0093* (2013.01); *A22C 21/0023* (2013.01);
(Continued)

(58) Field of Classification Search
CPC .............. A22C 17/002; A22C 17/0093; A22C 21/0023; A22C 21/0053; A22C 25/08; A22C 25/18; G01G 13/003
See application file for complete search history.

(56) References Cited

U.S. PATENT DOCUMENTS 5,998,740 A      12/1999   Kvisgaard et al.
12,239,138 B1 *   3/2025   Genshaft .................. A23B 4/28
(Continued)

FOREIGN PATENT DOCUMENTS

EP      3081315 A2    10/2016
EP      3192373 A1     7/2017
(Continued)

OTHER PUBLICATIONS

Extended European Search Report from corresponding European Patent Application No. 20209581.6, Jun. 4, 2021.
(Continued)

*Primary Examiner* — Omar Flores Sanchez
(74) *Attorney, Agent, or Firm* — Workman Nydegger

(57) ABSTRACT

A method and system is provided for generating batches of food pieces, and includes: conveying incoming food objects through at least one cutting device, where the at least one cutting device is configured to cut the incoming food objects into plurality of food pieces according to at least one first cutting rule, conveying the resulting plurality of cut food pieces to at least one batching system where at least one batch is generated fulfilling at least one first criterion including at least one first weight target. The at least one first cutting rule is selected in accordance to the at least one first weight target such that the resulting weight distribution of the plurality of food pieces entering the batching system fulfils at least one first pre-defined weight target distribution adapted to the at least one first weight target.

20 Claims, 2 Drawing Sheets

(51) Int. Cl.
*A22C 25/08* (2006.01)
*A22C 25/18* (2006.01)
*G01G 13/00* (2006.01)

(52) U.S. Cl.
CPC .......... *A22C 21/0053* (2013.01); *A22C 25/08* (2013.01); *A22C 25/18* (2013.01); *G01G 13/003* (2013.01)

(56) References Cited

U.S. PATENT DOCUMENTS

| | | | |
|---|---|---|---|
| 2016/0165906 A1 | 6/2016 | Lasslop | |
| 2017/0108855 A1* | 4/2017 | Hocker | G05B 23/0205 |
| 2017/0367354 A1* | 12/2017 | Jones | G06Q 10/08 |
| 2019/0029277 A1* | 1/2019 | Skrædderdal | A22C 17/002 |
| 2021/0068405 A1* | 3/2021 | Lanzky | B26D 7/18 |
| 2021/0354327 A1* | 11/2021 | Mayr | B26D 7/0616 |
| 2022/0279803 A1* | 9/2022 | Barnett | A22C 17/0093 |
| 2023/0063807 A1* | 3/2023 | Veber | A22C 7/00 |
| 2023/0219249 A1* | 7/2023 | Schäfer | B26D 7/28 83/29 |
| 2023/0227271 A1* | 7/2023 | Ochi | B65B 43/56 700/219 |

FOREIGN PATENT DOCUMENTS

| | | |
|---|---|---|
| WO | 2006086450 A1 | 8/2006 |
| WO | 2007022782 A2 | 3/2007 |
| WO | 2016113428 A1 | 7/2016 |
| WO | 2017125431 A1 | 7/2017 |
| WO | 2019243812 A1 | 12/2019 |

OTHER PUBLICATIONS

International Search Report from corresponding PCT Patent Application No. PCT/EP2021/082494, Feb. 9, 2022.

* cited by examiner

METHOD AND A SYSTEM FOR GENERATING BATCHES OF FOOD PIECES

FIELD OF THE INVENTION

The present invention relates to a method and system for generating batches of food pieces.

BACKGROUND OF THE INVENTION

Batching systems are configured to generate batches of food pieces fulfilling pre-defined target weight. In such systems, it is common to use several robotic systems that pick up incoming food pieces and place them into boxes or trays. In many cases, if the weight of the batches exceeds the target weight, the excess weight of the food pieces is at the expense of the manufacturer because the client only pays for this particular target weight.

For food pieces that differ much in weight, size and shape, the challenge of making batches with minimal overweight becomes obviously higher.

It is thus of outmost importance that the overweight is as low as possible to maximize the yield.

SUMMARY OF THE INVENTION

On the above background it is an object of embodiments of the present invention to provide an improved method and a system that overcomes the above addressed disadvantages by being more flexible in generating batches of food pieces with a minimal giveaway, although the food pieces may differ significantly in weight and/or type.

To better address one or more of these concerns, in a first aspect of the invention, a method is provided of generating batches of food pieces, comprising:
- conveying incoming food objects through a cutting device, where the cutting device is configured to cut the incoming food objects into plurality of food pieces according to a first cutting rule,
- conveying the resulting plurality of cut food pieces to a batching system where batches are generated fulfilling at least one first weight target,
- wherein the first cutting rule is selected in accordance to the at least one first weight target such that the resulting weight distribution of the plurality of food pieces entering the batching system is adapted to the at least one first weight target,
- wherein in case the batches fulfilling the at least one first weight target are changed to batches fulfilling at least one second weight target, a control signal is generated instructing the cutting device to adjust to a second cutting rule such that the resulting weight distribution of the plurality of resulting cut food pieces entering the batching system is adapted to the at least one second weight target.

Accordingly, the incoming weight distribution may be fully controlled and adapted dynamically to the weight target, such that the giveaway in the batches is minimized at all times.

Also, this prevents that incoming food pieces need to be rejected, which could easily be the case if the batch is "difficult". As an example, if the weight target of a batch is 1 kg and the incoming pieces would be on average 300 g, it would be difficult to complete the batch with a minimal giveaway. Instead, it might as an example be preferred to have the average weight around 200 g and preferably within a narrow range, e.g. between 190-210 g. The lower weight value may be a pre-set minimal value and the larger value may be a pre-set maximal value.

The control signal may also include data indicting which of the batches fulfilling the at least one first weigh criterion are completed or close to be completed, and which are not as close to be completed, where the cutting process may include an intermediate step where for some time interval the distribution of the cut food pieces is partly according to the at least first pre-defined weight target distribution and at least partly according to the at least one second pre-defined weight target distribution. This may also be formulated in the way that at least some of the first and the second cutting rules are applied simultaneously to this intermediate step. This would as an example be the case where only a part of the at least one first batch has been completed, e.g. all 2 kg batches are completed but some of the 3 kg batches are not yet completed, and where one or more of least one batch fulfilling the at least of second criterion are to be started. Thus, in this intermediate period may be continued until all the batches fulfilling at least one first criterion has been completed.

In one embodiment, the at least one first and/or the at least one second weight target further include weight target of the food pieces in the batches, such as average weight target weight of the food pieces or weight target interval of the food pieces in the batches, and/or number targets indicating the number of food pieces in the batches. As an example, a weight target for a batch may e.g. be 1.5 kg and the weigh requirement from a customer may be that the weight of the individual food pieces is in a certain range, e.g. ranging from 220-270 g. This would then be an additional requirement that needs to be fulfilled. In this case, it may be preferred to have the food pieces around 250 g because 6 of such pieces would fulfil the target weight.

The term pre-defined weight target distribution may in one embodiment be interpreted in a way where the top of the normal distribution is close or equal to a preferred target weight, e.g. referring to the previous example, the target would be close or as close as possible to 250 g. Moreover, the width of the normal distribution may be pre-defined, or dynamically adjustable, such that the resulting target weight has minimal giveaway.

In one embodiment, the food objects include:
- fish fillets and where the cut food pieces are fish fillet pieces such as loin piece(s), tail piece(s), belly piece(s), head end piece(s);
- poultry meat such as breast fillets where the cut food pieces are poultry pieces such as end piece(s) and/or poultry meat slices and/or remaining cut breast fillet;
- red meat such as pork, beef, lamb where the cut food pieces are red meat pieces such as end pieces(s), and/or red meat slices.

In one embodiment, the resulting food pieces have two or more different type characteristics, and where the at least one first criterion of the batches further includes the type of the food pieces in the batches. Thus, the flexibility of the system is enhanced since now, not only the weight target is fulfilled, but also, the type of the food pieces in the batches. This may be included in orders from customers that can have specific requirements for the batches, i.e. that they do not only fulfil certain weight targets but also targets regarding specific characteristics of the items in the batches. This may especially be relevant where the incoming food objects have characteristics such that the resulting food pieces have large varieties, e.g. large varieties in weight, color, size and/or shape, thickness or height.

As an example, a fish fillet that is cut into pieces results at least in loin piece(s), belly piece(s), tail piece(s), where the batches may further include the type of the fish pieces in the batches.

Another example is where one type is the end piece or pieces from the food objects, e.g. end part of a meat loin, which may be a single part or two or more slices (medallions), where the remaining part or slices from the remaining part of the food object is a food piece (or pieces) of the second type.

In case the food objects are poultry breasts, the part of the thickest part of the poultry part may be removed as a single piece or as few slices (medallions) defining first type characteristics. The slices may as an example have more or less the same thickness or be within the same weight range. The remaining part of the poultry breast, i.e. the cut breast, defines the second type which may have a second type target weight. The cut is preferably done such that the remaining part of the poultry breast looks as natural as possible. As an example, the first type target weight (each slice or the weight of a single end piece) may be 50 g, whereas the second type target weight may be 300 g. This would then mean that a poultry breast of 400 g would be cut into 2*50 g medallion slices, leaving 300 g for the remaining part (the second type). Another example may be where the medallions do not contribute to the batching process, and instead are removed from the batching process, where the remaining part of the food objects (i.e. after the removal of the front and/or the end part) contribute to the batching process. The remaining part may even be processed further and e.g. cut into slices or pieces which define the food pieces.

In one embodiment, the at least one of the at least one first weight target and/or the at least one second weight target contain two or more different target weights, and where the number of weight distributions of the plurality of resulting cut food pieces corresponds to the number of the first weight targets and/or the number of the second weight targets. As an example, if three first weight targets are being produced, the number of weight distributions is accordingly also three, one associated to each weight target. A situation could of course occur where one distribution is suitable for two (or more weight targets), e.g. 2 kg and 3 kg batches where the average weight of individual food piece is 200 g, a single distribution might be suitable for both these weight targets.

Another example is where the food objects is fish fillets, and where one weight target is 2 kg of the type "baby fillet" (belly piece containing a portion of a fish loin) and another weight target is 3 kg target of the type fish loin. For these different weight targets, there would preferably be two different associated weight distributions of different types adapted to each target that will lead to minimal overweight in both these weight targets.

In one embodiment, the number of weight distributions corresponds at least to the number of different types of batches. Referring to the example above, two different weight targets might be running for fish loin and one weight target for the "baby fillet", where a single weight distribution for that type might be sufficient to achieve the maximal yield meaning that only two distributions would be sufficient.

In an embodiment, the first and/or the second pre-defined weight target distributions are within a pre-defined weight range. This gives the at least one cutting device some flexibility to cut the food objects in the smaller, preferably, as close as possible to a preferred target weight.

In one embodiment, the geometrical profiles are determined and utilized as input data in cutting the food objects into the smaller pieces of fixed estimated weights. The geometrical profile may be a 2D or preferably a 3D profile of the incoming food objects, whereby e.g. by estimating the density (weight/volume) of the food objects the 2D or 3D density profile can be generated for the incoming food objects. The profile may be obtained using a camera, a line scanner based or an X-ray device.

In one embodiment, subsequent to cutting the food objects into smaller food pieces some or all the smaller food pieces are weighed by a weighing device. In that way, it is possible to make a check if the weight corresponds to the estimated weight using the geometrical and/or the density profile. Moreover, having such an accurate weighing data it is possible to enhance the accuracy of the batching process by utilizing the actual weighing data.

In one embodiment, the method further comprises comparing a determined weight of a given food pieces to a fixed estimated weight of the same food piece, where in case a deviation between the determined weight and the estimated weight exceeds a pre-defined threshold value, a control correction signal is generated to adjust the geometrical and/or the density profile such that the deviation is within the pre-defined threshold value.

Accordingly, it is ensured that the pre-defined weight target distribution is correct at all times and possible inaccuracy in the geometrical and/or density is almost immediately corrected.

In one embodiment, the step of cutting the incoming food objects into plurality of food pieces according to the at least one first cutting rule further comprises cutting at least one end and/or at least one side of the food objects into one or more slices. The one or more slices originating from the at least one end and/or at least one side may as already mentioned be used in another batching process and do not contribute to the at least one first or second pre-defined weight target distribution.

In one embodiment, the method further comprises, subsequent to cutting the incoming food objects into plurality of food pieces, creating a spacing between adjacent cut food pieces. It is thus ensured that one or more handling device, e.g. at least one robotic device having a suitable gripper or a sweep arm, have sufficient space to transfer the food pieces from the remaining stream of food pieces, and place them e.g. into trays. Such a spacing device may as an example include two conveyors placed in an end-to-end arrangement where the relative speed differences ensure that such a spacing is possible.

In one embodiment, the step of adapting the weight distributions of the plurality of food pieces entering the batching system includes ensuring that the prospects of the weight distributions best fit to the batches. As an example, if a first weight target includes a batch of 2 kg with an average weight food piece being 200 g, a suitable prospect may be all items between 185 g and 215 g, everything outside of that range is considered as non-suitable prospect.

In one embodiment, the step of instructing the cutting device to adjust to a second cutting rule is performed in two or more steps, each step being triggered after a completion of single first weight target batch.

In a second aspect of the invention, a system is provided for generating batches of food pieces, comprising:
  a control unit,
  a conveyor device for conveying incoming food objects through a cutting device, where the cutting device is controlled by the control unit, where the controlling includes instructing the cutting device to cut the incoming food objects into plurality of food pieces according to a first cutting rule, a conveyor device for conveying the resulting plurality of cut food pieces to a batching system where at least one batch is generated fulfilling at least one first weight target, wherein the first cutting rule is selected in accordance to the at least one first weight target such that the resulting weight distribution of the plurality of food pieces entering the batching system is adapted to the at least one first weight target, wherein the control unit is further configured, in case the at least one batch fulfilling at least one weight target is changed to at least one batch fulfilling at least one second weight target, to instruct the at least one cutting device according to received control signal to adjust the first rule to a second cutting rule such that the resulting weight distribution of the plurality of resulting cut food pieces entering the batching system is adapted to the at least one second weight target.

In one embodiment, the batching system comprises two or more different batching areas. Each bathing area includes at least one handling device, such as a robotic device or a sweep arm, to place incoming food pieces into different batching locations, such as trays, where the batching takes place. At each batching area one or more different batches having different target weights and even different types of batches may be generated.

The at least one cutting device may comprise any type of e.g. slicer for slicing the incoming food objects into slices, where the control unit may base it controlling on 2D or 3D profile of the food objects to control it into slices, or a volumetric slicer/portioning device.

In another alternative, the at least one cutting device is operable connected to an inspection device, which may be separated device, such as an X-ray device and a high-pressure water cutter, where the control unit controls the high pressure water cutter based on image data from the X-ray device. The cutting may further include removing undesired objects such as bones and cartilage from the food objects and subsequently cut the food objects into the smaller food pieces.

The conveying device for conveying the incoming food objects and the conveying device for conveying the food pieces may be different conveyor devices, or a single conveyor device, in both cases having an endless conveyor belt(s) on which the food objects and food pieces are resting while being conveyed.

In one embodiment, the system further comprises at least one additional cutting device where the two or more cutting devices are configured to receive food objects of different characteristics or preferably with at least one characteristic property parameter.

In yet another embodiment, the system further comprises a measuring device for measuring the at least one characteristic property parameter, such as weight, size, shape, color, of incoming food objects, conveyed e.g. by an infeed conveyor, using e.g. a scale, camera, laser line scanner and the like, where the control unit is further configured to utilize at least one of these characteristic property parameters as an input parameter(s) in allocating the food objects to the two or more cutting devices.

Accordingly, it is thus possible to control the allocation of the incoming food objects into different cutting devices, e.g. by assigning food objects having similar characteristics, which may be favorable to enhance the homogeneity of the resulting food pieces and thus even minimize the giveaway in the batches further. As an example, one cutting device may be adjusted to cut "large" poultry fillet (e.g. >300 g), another cutting device may be adjusted to cut "medium" poultry fillet (e.g. 200-300 g), and yet another cutting device may be designed to cut "small" poultry fillet (e.g. <200 g).

In general, the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

Figure 1:
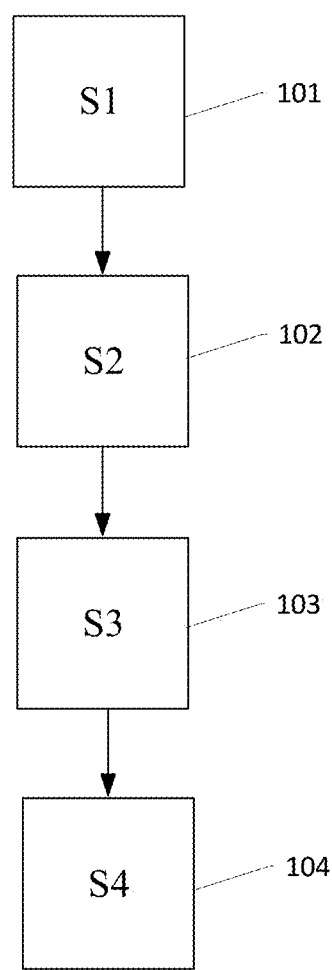
FIG. 1 shows a flowchart of one embodiment of a method according to the present invention.

FIG. 1 shows a flowchart of one embodiment of a method according to the present invention for generating batches of food pieces, where the food pieces originate from food objects after undergoing a cutting process.

In a first step (S1) 101, food objects are conveyed through a cutting device. The cutting device may be any type of slicer, portioning device, high pressure water cutter, where any type of image data of the incoming food objects may be utilized as an input data by a control unit in controlling the cutting device when cutting the food objects into plurality of food pieces according to a first cutting rule, preferably having preferred target weight. The resulting food pieces may have two or more different type characteristics, and where at least one first criterion of the batches may further include the type of the food pieces in the batches. The food pieces may as an example be any types of meat, such as primal parts of red meat where the food pieces may include meat slices, or a particular part of a primal such as tail part or loin. The food pieces may also as an example be fish fillets where the resulting food pieces are e.g. loin, or loin portions originating from the fish fillet, or belly or belly parts, or tail or tail parts, or the food pieces may include poultry slices/pieces, meat slices/pieces.

In a second step (S2) 102, the resulting plurality of cut food pieces are conveyed to a batching system where at least one batch is generated fulfilling at least one first weight target.

The at least one first cutting rule is selected in accordance to the at least one first weight target such that the resulting weight distribution of the plurality of food pieces entering the batching system fulfils at least one first pre-defined weight target distribution adapted to the at least one first weight target.

In a third step (S3) 103, the at least one first weight target is changed to at least one second weight target. This may as an example be because orders in the system coming from outside customers changes, where a new order is received with one or more new orders having one or more new second pre-defined target weights.

In a fourth step (S4) 104, a control signal is then generated for the cutting device to adjust the first cutting rule a second cutting rule such that the resulting weight distribution of the plurality of resulting cut food pieces entering the batching system is adapted to the at least one second weight target. This change may occur over some time period meaning that not all of a sudden all the new incoming distribution is in line with the second pre-defined weight target. This may as an example happen gradually within e.g. few seconds or minutes, until all the distribution of the food pieces follow the at least one second pre-defined weight target.

The at least one first weight target and/or the at least one second weight target may contain two or more different weight targets, e.g. 3 kg and 5 kg target, and where the number of at least one first and/or the second pre-defined weight target distribution correspond to the number of the at least one first weight target and/or the number of the at least one second weight target.

The at least one first/second criterion includes, but is not limited to, a desired weight, e.g. average weight of the food pieces, or other characteristics such as average thickness, number of pieces in a batch.

Figure 2:
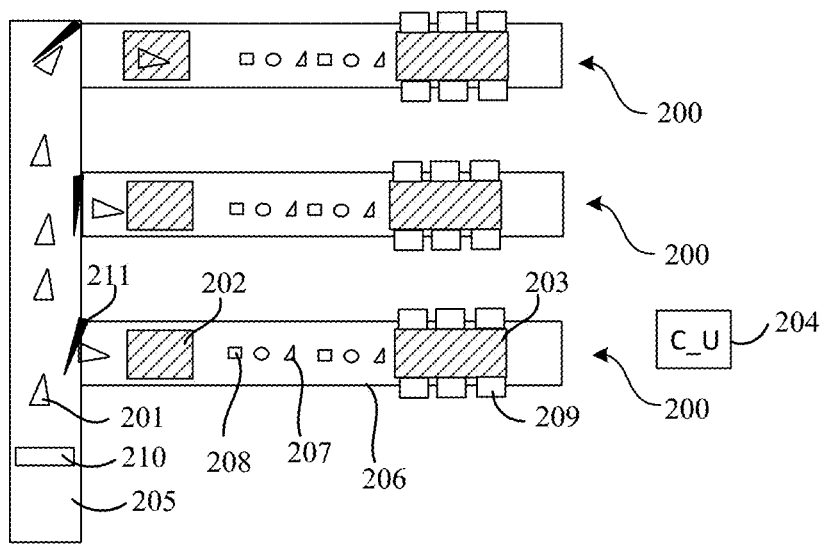
FIG. 2 shows an embodiment of a system according to the present invention for carrying out the method steps in FIG. 1.

FIG. 2 shows an embodiment of a system 200 according to the present invention for generating batches of food pieces according to the method discussed in relation to FIG. 1. The system comprises a conveyor device 206 for conveying incoming food objects 201 through at least one cutting device 202, where the at least one cutting device is controlled by a control unit 204, where the controlling includes instructing the at least one cutting device to cut the incoming food objects into plurality of food pieces 207, 208 according to the at least one first cutting rule. The conveyor device 206 also conveys the resulting plurality of cut food pieces to a batching system 203 where the at least one batch is generated in e.g. plurality of boxes or trays 209 fulfilling the at least one first weight target.

The embodiment shown here comprises three parallel arranged systems 200 (this should of course not be construed as being limited to three, could just as well be two or more than three), where the system further comprises an infeed conveyor 205 for conveying the incoming food objects 201 where at least one characteristic property, such as weight, size, shape, color, of incoming food objects is acquired by a measuring device 210, which could e.g. be selected from one or more of: a scale, camera, laser line scanner, etc. The acquired at least one characteristic property is utilized as an input parameter by the control unit 204 in allocating the incoming food objects to one of the three systems 200 via opening and closing of sweep arms 211. This could be based on the size and/or shape and/or weight etc., which one fits best into which of the three systems.

Also, the batching process taking place in the three systems may originate from two or more different orders from different customers that may have different preferences, which could e.g. be larger average weight for individual food pieces, meaning that e.g. a large food object might be better suited for a specific customer.

As discussed in relation to FIG. 1, the step of cutting the food objects into smaller pieces is done such that the smaller pieces fulfil a certain weight requirement, e.g. are within a specific weight range, e.g. 190 g-210 g, but in order to be able to do so, it is preferred that further information about the incoming food objects into the at least one cutting device (or in the at least one cutting device) is known, and utilized as an operation parameter in operating the at least one cutting device. This might be geometrical data acquired by measuring device 210, or this may be geometrical information acquired at the at least one cutting device where e.g. a camera or a e.g. a 3D line scanner (or similar device) is placed upstream to each of the at least one cutting device.

In one embodiment, the at least one cutting device comprises an inspection device such as an X-ray device and a high pressure water cutter, where the control unit controls the high pressure water cutter based on image data from the X-ray device, i.e. the image data from the X-ray sensors placed (typically) below a conveyor belt on which the food objects are resting are not only used to identify undesired objects that are to be cut and removed, such as bone structure in fish fillets, but also to generate a 2 or 3D profile when cutting it into food pieces that are with a certain weight range, and the result in said pre-defined weight target distributions.

To further enhance the reliability and/or accuracy, a weighing device may be placed downstream relative to the at least one cutting device to accurately measure the cut food pieces.

Figure 3:
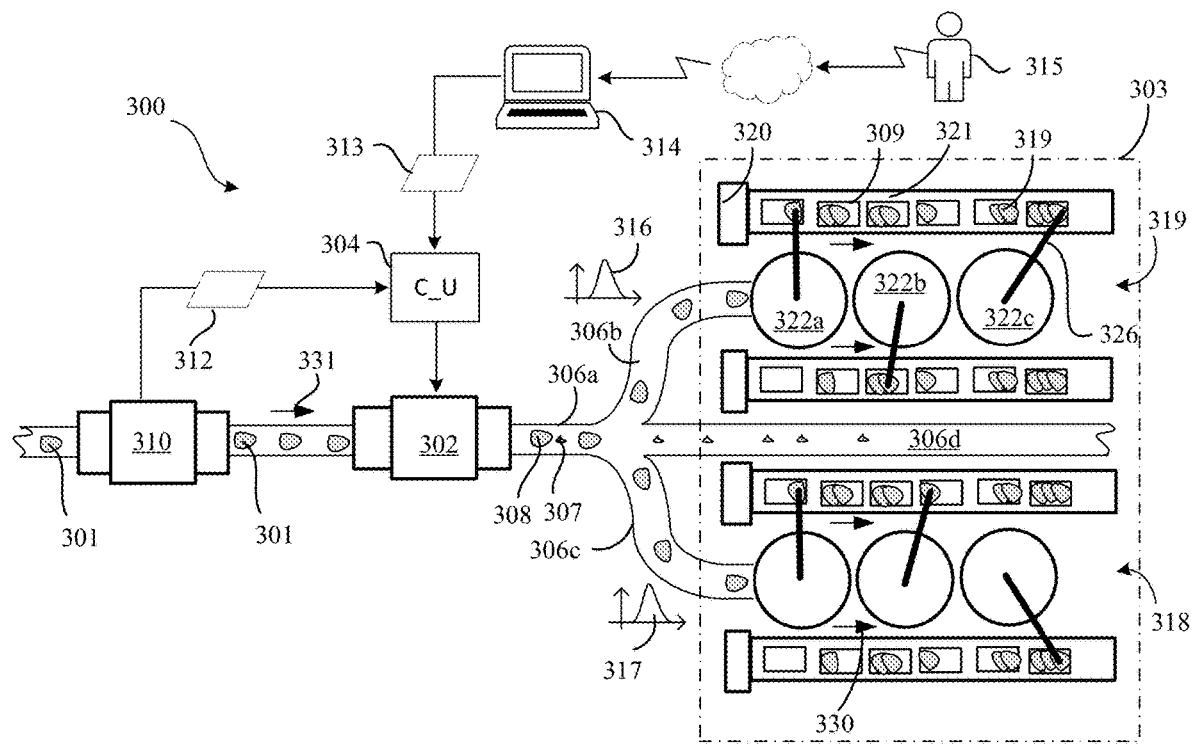
FIG. 3 shows another embodiment of a system for generating batches of food pieces according to the present invention.

FIG. 3 shows another embodiment of a system for generating batches of food pieces 319, comprising a control unit 304, a conveyor device 306 for conveying incoming food objects 301 conveyed in a conveyor direction indicated by arrow 331 through a cutting device 302, where the cutting device is controlled by the control unit 304. A measuring device 310 which may be an X-ray device, a line scanner, a camera, and the like, acquires image data 312 e.g. about the size and/or shape and/or weight, where this data 312 is used as a control parameter in controlling the cutting device 302 to cut the incoming food objects into plurality of food pieces according a first cutting rule. The measuring device 310 and the cutting device 302 may be incorporated into one and the same device.

The first cutting rule is selected in accordance to the at least one first weight target order from a customer 315, where an order from a customer is received by a computer system 314 and processed where the resulting order data 313 from the customer 315 may e.g. be 500*2 kg batches and 700*4.5 kg batches of poultry pieces and a bulk for cut off parts (not contributing to the batching process), such that the resulting weight distribution of the plurality of food pieces 308 entering the batching system is adapted to the at least one first weight target. As shown in this embodiment, the conveyor device 306 (may be multiple conveyors) dividing the food pieces to a first batching area 319 via conveyor 306b and conveyor 306c, e.g. because of different distributions 316, 317, where e.g. in the first batching area the 500 2 kg batches whereas in the second batching area the 700*4.5 kg batches are being produced.

All remaining cut off pieces 307 may be conveyed via conveyor 306d to another process, e.g. to said bulk.

The number of batching areas should of course not be construed as being limited to two batching areas, the batching system 303 may just as well include just a single batching area or more the one batching area, where as shown here, each batching area comprises at least one handling device, e.g. three robotic devices 322a,b,c each having a robotic arm 326. This should not be construed to three robotic devices, but a single robotic device or more than two robotic devices may just as well be implemented. The robotic device may of course also be replaced with sweep arms or the like.

The incoming distributions 316, 317 of the cut food pieces into the batching areas 319, 318 is thus the most optimal distribution at all times for the batches currently being produced in each batching area. It should be noted that in this example, multiple of different batches may be produced with the same batching area, and thus multiple of different weight distributions may be present within each batching area.

Each batching area may be provided with a tray feeding device 320 that automatically releases an empty tray 309 onto a tray feeding conveyor 321 that advances the trays in a direction indicated by arrow 330 in e.g. discrete steps, while the trays are being filled with food pieces until the weight targets are achieved. The order data 313 may further include a weight range of the individual food piece in the batches, and even the type of food piece in the batches.

When a new order is received from e.g. another customer 315 having different order data 313 including different target weights, the control unit 304 will receive this data 313 to instruct the cutting device 302 to cut according to a second cutting rule so that the resulting distributions of the cut food pieces fit to the new batches currently being produced in the batching system 303. This transfer of the first cutting rule to the second cutting rule may occur over some time range until all the 500*2 kg batches and 700*4.5 kg batches (first order) have been completed. In another scenario, the first order is fully completed before the second order starts.

Figure 4A:
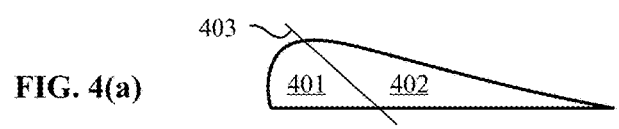
FIG. 4*a-d* show an example of different cutting patterns where the food object is a poultry fillet.

FIG. 4a-d show an example where the food object is a poultry fillet, where FIG. 4a shows where the cutting pattern 403 (first or a second cutting rule) results in a single front piece 403 (medallion) leaving a remaining part 402 as a fillet, which preferably has as natural appearance as possible.

Figure 4B:

FIG. 4b shows multiple of cut medallions 402 leaving a remaining part 402 as a fillet, where the cut medallions may fulfil a weight and/or thickness target, and/or where the remaining fillet 403 is within a pre-defined weight target such that the resulting distribution of such fillets 403 are adapted to weight targets that are being produced.

Figure 4C:
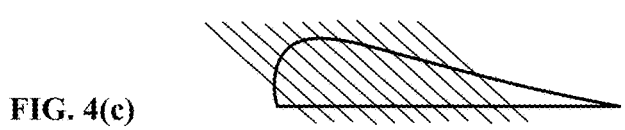

FIG. 4c shows another cutting patterns where more or less the whole poultry fillet is cut into medallions.

Figure 4D:
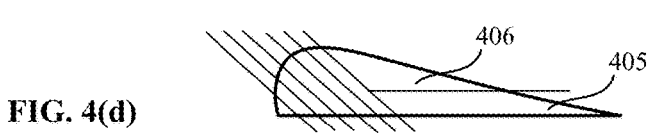

FIG. 4d shows where the front part of the poultry fillet is cut into several medallions, and the remaining part is schnitzel 405 and fillet 406.

What may be decisive for different cuts is the total weight of the incoming poultry fillets, e.g. a very large fillet may be suited for the cutting pattern in FIG. 4b, whereas a smaller fillet may be more suitable for cutting pattern 4a.

Also, depending on the orders from the customer, all these different cutting patterns may be done at the same time, i.e. some fillets with suitable characteristics are cut as shown in FIG. 4a, another characteristics is suitable to be cut according to FIG. 4b etc.

The cut patterns (first/second cutting rule) shown here may of course also apply to food objects such as, but not limited to, red meat loins, e.g. pork loin, beef loin, fish fillet, lamb meat etc.

The term first cutting rule may be understood as one or all the cutting rules shown in FIG. 4a-d and the second cutting rule may be understood as multiple of different cuts, or similar cuts but e.g. with different weight targets.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A method of generating batches of food pieces, comprising:
conveying incoming food objects through two or more cutting devices, where at least one cutting device of the two or more cutting devices is configured to cut the incoming food objects into plurality of food pieces according to a first cutting rule, and
conveying a resulting plurality of cut food pieces to a batching system where batches are generated fulfilling at least one first weight target,
wherein the first cutting rule is selected in accordance to the at least one first weight target such that a resulting weight distribution of the plurality of food pieces entering the batching system is adapted to the at least one first weight target,
wherein in case the batches fulfilling the at least one first weight target is changed to batches fulfilling at least one second weight target, a control signal is generated instructing the at least one cutting device of the two or more cutting devices to adjust to a second cutting rule such that the resulting weight distribution of the plurality of resulting cut food pieces entering the batching system is adapted to the at least one second weight target,
the method further comprising: measuring at least one characteristic property parameter of the incoming food objects including one or more of weight, size, shape, color of the food objects and utilizing one or more of the least one characteristic property parameter as an input parameter in allocating the food objects to the two or more cutting devices.

2. The method according to claim 1, wherein the resulting food pieces have two or more different type characteristics, and where the batches further include type characteristic targets.

3. The method according to claim 1, wherein at least one of the at least one first weight target and/or the at least one second weight target contain two or more different target weights, and where a number of weight distributions of the plurality of resulting cut food pieces corresponds to the number of the first weight targets and/or the number of the second weight targets.

4. The method according to claim 1, wherein the weight distributions of the plurality of resulting cut food pieces entering the batching system are within a pre-defined weight range.

5. The method according to claim 1, wherein the food objects include:
fish fillets and where the cut food pieces are fish fillet pieces such as loin piece(s), tail piece(s), belly piece(s), head end piece(s); and/or
poultry meat such as breast fillets where the cut food pieces are poultry pieces such as end piece(s) and/or poultry meat slices and/or remaining cut breast fillet; and/or
red meat such as pork, beef, lamb where the cut food pieces are red meat pieces such as end pieces(s), and/or red meat slices.

6. The method according to claim 1, wherein geometrical and/or density profiles is determined for the incoming food objects and utilized as input data in cutting the food objects into smaller pieces having weight estimate targets.

7. The method according to claim 1, wherein after cutting the food objects into the plurality of food pieces, smaller food pieces are weighed a weight determining device.

8. The method according to claim 6, further comprising comparing a determined weight of a given food piece to a weight estimate target of the same food piece, where in case a deviation between the determined weight and the weight estimate target exceeds a pre-defined threshold value, a control correction signal is generated to adjust the geometrical and/or the density profile such that the deviation for subsequent food pieces becomes within the pre-defined threshold value.

9. The method according to claim 1, wherein the weight of individual food pieces in the batches have associated weight targets, and/or a number of food pieces in the batches have associated number targets.

10. The method according to claim 1, wherein the step of cutting the incoming food objects into plurality of food pieces according to the first cutting rule comprises cutting at least one end and/or at least one side of the food objects into one or more slices.

11. The method according to claim 1, further comprising, subsequent to cutting the incoming food objects into plurality of food pieces, creating a spacing between adjacent cut food pieces.

12. The method according to claim 1, where the step of adapting the weight distributions of the plurality of food pieces entering the batching system includes ensuring that prospects of the weight distributions best fit to the batches.

13. The method according to claim 1, wherein the step of instructing the at least one cutting device of the two or more cutting devices to adjust to a second cutting rule is performed in two or more steps, each step being triggered after a completion of single first weight target batch.

14. The method according to claim 1, where the batching system comprises two or more different batching areas.

15. A system for generating batches of food pieces, comprising:
    a control unit, and
    a conveyor device for conveying incoming food objects through two or more cutting devices, where at least one cutting device of the two or more cutting devices is controlled by the control unit, where the controlling includes instructing the at least one cutting device of the two or more cutting devices to cut the incoming food objects into plurality of food pieces according a first cutting rule, and
    a conveyor device for conveying a resulting plurality of cut food pieces to a batching system where at least one batch is generated fulfilling at least one first weight target,
    wherein the first cutting rule is selected in accordance to the at least one first weight target such that a resulting weight distribution of the plurality of food pieces entering the batching system is adapted to the at least one first weight target,
    wherein the control unit is further configured, in case the at least one batch fulfilling at least one weight target is changed to at least one batch fulfilling at least one second weight target, to instruct the at least one cutting device of the two or more cutting devices according to received control signal to adjust the first rule to a second cutting rule such that the resulting weight distribution of the plurality of resulting cut food pieces entering the batching system is adapted to the at least one second weight target,
    wherein the system further comprises a measuring device for measuring at least one characteristic property parameter of the incoming food objects including one or more of weight, size, shape, color of the food objects, and
    wherein the control unit is further configured to utilize one or more of the least one characteristic property parameter as an input parameter in allocating the food objects to the cutting device and at least one additional cutting device.

16. The system according to claim 15, where the batching system comprises two or more different batching areas.

17. The system according to claim 15, wherein the resulting food pieces have two or more different type characteristics, and where the batches further include type characteristic targets.

18. The system according to claim 15, wherein at least one of the at least one first weight target and/or the at least one second weight target contain two or more different target weights, and where a number of weight distributions of the plurality of resulting cut food pieces corresponds to a number of the first weight targets and/or the number of the second weight targets.

19. The system according to claim 15, wherein the weight distributions of the plurality of resulting cut food pieces entering the batching system are within a pre-defined weight range.

20. The system according to claim 15, wherein the food objects include:
    fish fillets and where the cut food pieces are fish fillet pieces such as loin piece(s), tail piece(s), belly piece(s), head end piece(s); and/or
    poultry meat such as breast fillets where the cut food pieces are poultry pieces such as end piece(s) and/or poultry meat slices and/or remaining cut breast fillet; and/or
    red meat such as pork, beef, lamb where the cut food pieces are red meat pieces such as end pieces(s), and/or red meat slices.

* * * * *